G. C. HIGBEE.
AIR BRAKE FOR AUTOMOBILES.
APPLICATION FILED SEPT. 21, 1918.
1,297,165.
Patented Mar. 11, 1919.
2 SHEETS—SHEET 1.
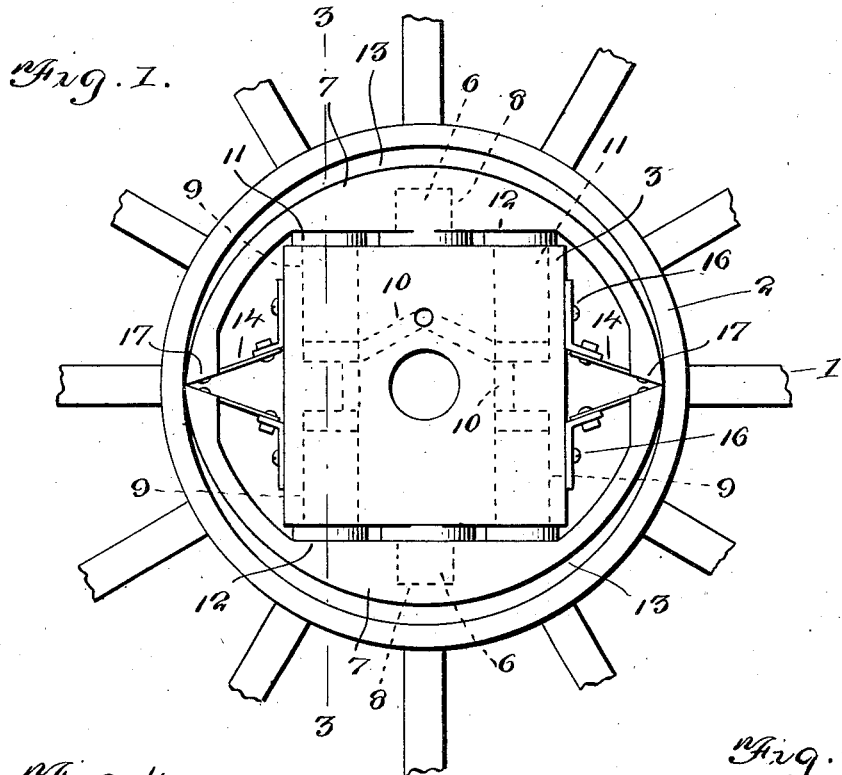
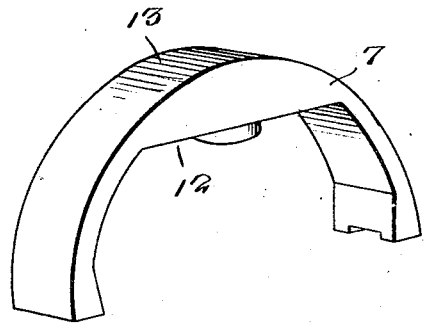
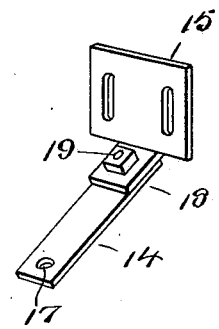
Witness
E. R. Ruppert.
Inventor
G. C. Higbee
By Victor J. Evans
Attorney

G. C. HIGBEE.
AIR BRAKE FOR AUTOMOBILES.
APPLICATION FILED SEPT. 21, 1918.

1,297,165.

Patented Mar. 11, 1919.
2 SHEETS—SHEET 2.

Witness
E. Q. Ruppert.

Inventor
G. C. Higbee
By Victor J. Evans
Attorney

UNITED STATES PATENT OFFICE.

GEORGE C. HIGBEE, OF TEKOA, WASHINGTON.

AIR-BRAKE FOR AUTOMOBILES.

1,297,165.  Specification of Letters Patent.  Patented Mar. 11, 1919.

Application filed September 21, 1918.  Serial No. 255,148.

*To all whom it may concern:*

Be it known that I, GEORGE C. HIGBEE, a citizen of the United States, residing at Tekoa, in the county of Whitman and State of Washington, have invented new and useful Improvements in Air-Brakes for Automobiles, of which the following is a specification.

This invention relates to air brakes and the brake hereinafter described and herein illustrated is especially designed for use in conjunction with automobiles and motor vehicles in general.

The object of the invention is to provide a brake which may be readily applied to one or more of the wheels of a motor vehicle and operated by compressed air stored in a suitable tank by means of an air compressor which may be mounted upon the vehicle and driven by the power of the vehicle engine.

The improved brake may be easily controlled by means of a valve such as a three-way cock, by means of which the air may be admitted to the brake mechanism as required.

With the above and other objects in view, the invention consists in the construction, combination and arrangement of parts, as herein described, illustrated and claimed.

In the accompanying drawings:—

Figure 1 is a vertical section taken transversely of one of the axles and axle housings of a motor vehicle, showing the improved brake mechanism in its applied relation to an adjacent wheel, the adjacent face plate of the brake housing being removed to show the brake mechanism in elevation.

Fig. 4 is a detail perspective view of one of the brake shoes.

Fig. 5 is a detail perspective view of one of the brake shoe springs showing the adjustable feature thereof.

Figure 2:
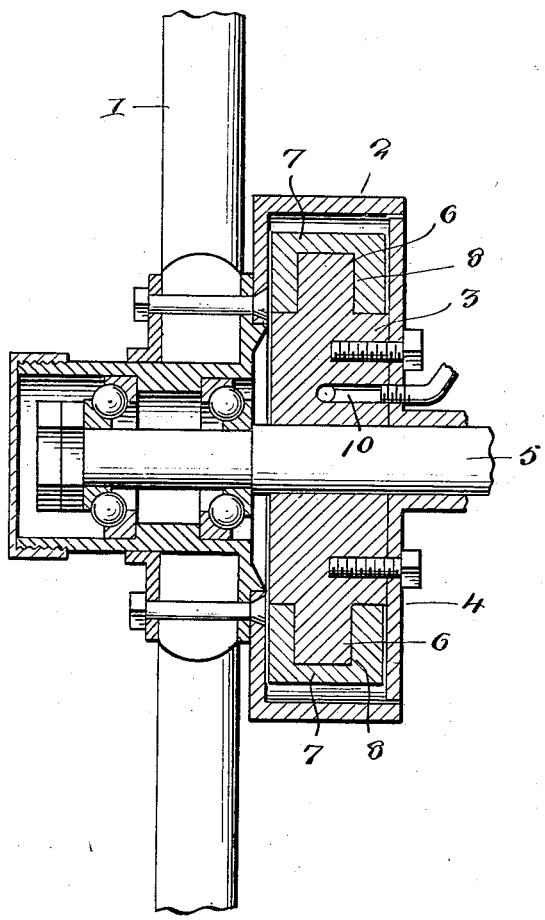
Fig. 2 is a vertical longitudinal section through the brake mechanism.
Figure 3:
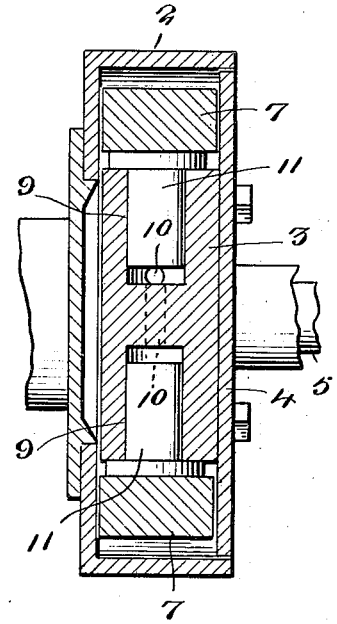
Fig. 3 is a vertical transverse section on the line 3—3 of Fig. 1.

It will be understood as the description proceeds that the invention contemplates the use of a brake mechanism in conjunction with one or more of the wheels of a motor vehicle but as the brake mechanism used in conjunction with each wheel is the same, a description of one brake mechanism will answer for all.

Each brake mechanism comprises in conjunction with the respective vehicle wheel 1, a brake drum 2 which is fixedly secured by any suitable fastening means, such as bolts or rivets to the wheel 1, said brake band or drum revolving with the wheel as a part thereof.

Arranged within the brake drum 2, is an internal expanding brake mechanism, the same comprising a stationary or non-rotary air chest 3 which may form a part of the housing 4 of the axle 5 upon which the wheel 1 and brake drum 2 are mounted. The chest 3 is provided at diametrically opposite points with radially extending guiding means such as studs 6 and mounted slidably on each stud 6 is an arcuate and substantially semi-circular brake shoe 7 which is movable into and out of frictional contact with the inside face of the brake drum 2, each brake shoe 7 being held against rotation by reason of its connection with the chest 3. The central portion of each brake shoe 7 is made thicker than the end portions thereof as shown, and such central portion is formed with a guiding socket 8, which receives the adjacent guiding stud 6.

The chest 3 is provided at opposite sides of each stud 6 with compressed air cylinders or cavities 9 which communicate with a compressed air inlet passage 10, said passage being formed with branches leading to the cylinders 9, whereby air pressure is equalized in both of the cylinders 9. Mounted for reciprocatory movement in the cylinders 9 are pistons or plungers 11, the inner ends of which are closed to receive the full force of the compressed air, the latter acting to force the pistons or plungers 11 outwardly against the inner straight or flat surface 12 of the adjacent brake shoe 7, whereby the outer working surface 13 of said brake shoe is moved into frictional contact with the inner surface of the brake drum. It is to be understood that two brakeshoes may be used in conjunction with each chest 3, and that the passage 10 will have branches leading to all of the cylinders 11 of the chest 3. In this way, both brake shoes are forced outwardly into braking contact with the drum 2 when compressed air is admitted through the passage 10.

Each brake shoe is flexibly connected with the chest 3 by means of springs 14, each comprising a relatively broad base 15 having slots extending longitudinally of the adjacent edge of the chest 3 and receiving adjusting screws 16 which are threaded into the chest 3. By the means just described, the springs may be accurately adjusted to hold the brake shoe clear of the inside working face of the drum 2. The outer end of each spring is secured by fastening means 17 to the adjacent extremity of the brake shoe. In order to provide for any slight variation in the size of the brake shoes and the chest 3 and also provide for an accurate setting of each brake shoe, one spring of each brake shoe is transversely divided into sections which are overlapped as shown at 18 and secured together by fastening means 19 which admits of the relative longitudinal adjustment of the sections of the spring for the purpose set forth.

A suitable compressed air tank, (not shown), may be mounted at any convenient point on the frame of the machine, and connected with the passage 10 by a pipe which will be controlled by a suitable stop cock, (not shown). Any suitable type of air compressor may be driven by the engine of the vehicle so as to supply said compressed air tank.

I claim:

1. The combination with one of the carrying wheels of a motor vehicle, of a rotary brake drum fixedly secured to and revolving with said wheel, a non-rotary air chest housed within said drum and having oppositely extending guiding studs, arcuate brake shoes slidably mounted on said studs and movable toward and away from said chest and the working face of said drum, compressed air cylinders formed in said chest at opposite sides of each of said studs, the chest being formed with an air passage having branches leading to said cylinders, pistons mounted for sliding movement in said cylinders and working in engagement with the adjacent brake shoe at opposite sides of the adjacent guiding stud, and flexible means connecting the opposite extremities of each brake shoe with said chest.

2. The combination with one of the carrying wheels of a motor vehicle, or a rotary brake drum fixedly secured to and revolving with said wheel, a non-rotary air chest housed within said drum and having oppositely extending guiding studs, arcuate brake shoes slidably mounted on said studs and movable toward and away from said chest and the working face of said drum, compressed air cylinders formed in said chest at opposite sides of each of said studs, the chest being formed with an air passage having branches leading to said cylinders, pistons mounted for sliding movement in said cylinders and working in engagement with the adjacent brake shoe at opposite sides of the adjacent guiding stud, and flexible means connecting the opposite extremities of each brake shoe with said chest, said flexible means consisting of springs each having the opposite extremities thereof attached to the adjacent brake shoe and said chest, one of said springs being longitudinally extensible.

In testimony whereof I affix my signature.

GEORGE C. HIGBEE.